US005501899A

United States Patent [19]

Larkin

[11] Patent Number: 5,501,899

[45] Date of Patent: Mar. 26, 1996

[54] STATIC ELIMINATOR AND METHOD

[76] Inventor: William J. Larkin, 27 Parsons Dr., Swampscott, Mass. 01907

[21] Appl. No.: 247,051

[22] Filed: May 20, 1994

[51] Int. Cl.$^6$ .............. H02H 1/00; D04H 1/58

[52] U.S. Cl. .............. 428/288; 428/40; 428/290; 428/311.1; 428/343; 428/344; 428/254; 428/261; 361/212

[58] Field of Search .............. 428/922, 261, 428/344, 343, 40, 311.1, 288, 290; 361/212

[56] References Cited

U.S. PATENT DOCUMENTS

| | | | |
|---|---|---|---|
| 3,475,213 | 10/1969 | Stow | 428/344 X |
| 3,757,164 | 9/1973 | Binkowski | 317/2 R |
| 3,904,929 | 9/1975 | Kanaya et al. | 317/2 R |
| 3,936,170 | 2/1976 | Shibano et al. | 355/3 R |
| 3,986,530 | 10/1976 | Maekawa | 428/922 X |
| 4,364,739 | 12/1982 | Tomibe et al. | 8/654 |
| 4,410,593 | 10/1983 | Tomibe et al. | 428/389 |
| 4,553,191 | 11/1985 | Franks et al. | 361/212 |
| 4,563,232 | 1/1986 | Peake | 428/261 X |
| 4,961,804 | 10/1990 | Aurichio | 428/40 X |
| 4,966,729 | 10/1990 | Carmona et al. | 252/511 |
| 4,971,726 | 11/1990 | Maeno et al. | 252/511 |
| 4,976,890 | 12/1990 | Felter et al. | 252/511 |
| 4,983,148 | 1/1991 | Nakagawa | 474/263 |
| 5,049,850 | 9/1991 | Evans | 338/22 R |
| 5,075,036 | 12/1991 | Parish et al. | 252/511 |
| 5,082,595 | 1/1992 | Glackin | 252/511 |
| 5,084,211 | 1/1992 | Kawaguchi et al. | 252/511 |
| 5,246,771 | 9/1993 | Kawaguchi | 428/344 X |
| 5,262,229 | 11/1993 | Lampert et al. | 428/344 X |
| 5,354,607 | 10/1994 | Swift et al. | 428/294 |

OTHER PUBLICATIONS

Luxon, B., "EMI/RFI Shielding", *Soc. Plastics Engrs, Chicago Section,* Tech. Conf. Abstract (1984).

Fahey, L. J., "Architectural Sheilding With Advanced Nonwoven Structures", (Publication unknown).

Brochure, Nippon Sammo Dyeing Co., Ltd. (Date unknown).

Various Brochures, American Cyanamid Co., Re Cycom MCG Fiber Prods. (Dec. 1984 to Jul. 1985).

Various Product Literature, International Paper, Re Safnshielded Prods. (Feb. 1989).

*Primary Examiner*—George F. Lesmes
*Assistant Examiner*—Terrel Morris
*Attorney, Agent, or Firm*—Frances P. Craig

[57] ABSTRACT

A low profile ionizing surface (LPIS) for use as a static eliminator or charging means in an apparatus within which insulative material is contacted by apparatus surfaces. The LPIS includes a low profile fibrous network of randomly disposed, electrically conductive, 0.5–50 μm by 1/8"–3" microfibers in electrically conductive contact with one another across the network, providing microfiber ionizing points across the network surface. The thickness of the network is significantly less than the average length of the microfibers. An adhesive layer fixes the network to a surface of the machine. Thus, when the network is grounded or electrically charged, static charge is removed from the material as it passes across or near the exposed surface of the network. The LPIS may be in the form of a peel-and-stick sheet or tape, or a kit may be provided to install the LPIS in an apparatus. An ionizing part for an apparatus, the part including the LPIS, and a method for ionization of air between a surface of an apparatus and a passing insulative material are also disclosed.

6 Claims, 5 Drawing Sheets

STATIC ELIMINATOR AND METHOD

BACKGROUND OF THE INVENTION

The present invention relates to the discharging of static electricity, and particularly to a device and method for removing static charge from a surface ionization of air.

Static electricity is defined as surface storage of electric charge. This surface charge is caused by the transfer of electrons when two similar or dissimilar surfaces contact. The charge also creates a voltage field which attracts or repels other objects which are proximate to the field. (This attraction or repulsion can create problems, as will be discussed further hereinafter.) This voltage pressure or potential induces out from the surface in all directions when the charged object is in space. It is the induced voltage pressure which pushes the static charge to ionize.

Ways of controlling static charge are known. Induction static eliminators take advantage of the voltage field around a statically charged surface by inducing ionization of the air at or near conductive points (or ends) of small cross-sectional area within the voltage field. The voltage pressure or potential is increased around the conductive points, inducing ionization of the air; the ionized air and the conductive points provide a path to ground for the charge. Known induction static eliminators typically use a fixed row of grounded bundles or brushes of conductive threads or fine wires, or grounded strips, e.g. of copper, held perpendicularly to a passing surface to touch or nearly touch the charged surface to ionize the air within the voltage field. The small cross-sectional area at the tip of each thread or fine wire or end point of each strip increases the voltage pressure or potential at the tip, end, or point (hereinafter "point"), inducing ionization of the air surrounding the point.

Alternatively, the grounded conductive material may be in the form of "tinsel" (a strand of twisted-together conductive strips with protruding strip ends) or a conductive sheet with one edge cut into jagged points. The small cross-sectional surface area of these strip ends or points and the proximity of these "points" to the charged surface enables ionization of the air within the voltage field and conduction of the charge to ground in the same manner as that described above.

Electrically powered static eliminators are similar to inductive eliminators, in that similar ionizing "points" of small cross-sectional surface area are arrayed perpendicularly to the charged surface. Alternating positive and negative voltages typically are applied to the ionizing "points" to ionize the air around the points to neutralize nearby charges.

Nuclear static eliminators also ionize surrounding air to neutralize static charge. Strips of radioactive material, typically in the form of a foil, provide ionizing "points" which emit alpha particles, producing positive and negative ions which, in turn, exchange electrons with the charged surface molecules to neutralize them.

The typical method for controlling static on conductors, e.g., metal objects or people, is to ground them. For example, a charge buildup may be prevented on a human operator by providing a path to ground for the charge by such means as grounded conductive mats, conductive wrist straps, and conductive shoe straps. However, only objects that will conduct electrical energy or charge can be grounded.

The major problem in static control on insulators, e.g., plastics, synthetics, or paper, is that by definition insulators cannot be grounded. Further, when an insulative material contacts a grounded conductive surface, the insulator cannot give up its surface charge. Also, there will be a transfer of electrons taking place due to such contact, which can further charge the surface of the insulative material. The insulative surface, having a greater affinity for electrons, will oftentimes build up a negative charge, while the opposite polarity generated on the conductive surface will instantaneously be conducted to ground. Thus, even if machine surfaces are made from a metal or other conductor(s) and are grounded, they cannot eliminate static charge buildup on non-conductive objects or materials coming in contact with them. Further, a static charge can be generated on surfaces of such non-conductors by their contact with grounded conductors.

A major limitation of the prior art static eliminators described above is that they are only effective when the field of the charged object is undisturbed and in space (i.e., not in contact with other objects). When a charged object is in contact with or in close proximity to another object or surface, the field is disturbed and induces toward the other object or surface. For example, when a flat material such as a sheet of plastic is charged and placed in contact with another flat surface, the charge on the plastic sheet induces toward the other surface, causing the plastic sheet to cling to the flat surface. Concurrently, the voltage field on the opposite (non-contacting) side of the plastic sheet is not available for induction to nearby static eliminator ends or points or for charge neutralization by positive and/or negative ions generated by an active alpha or electric ionizer.

This phenomenon can be explained by the formula for static charge, $$C=V/Q$$

where C represents the static charge, V represents the voltage, and Q represents the capacitance of a statically charged material. When a charged object is in space, Q=1. Thus all of the voltage pressure is available for static removal by induction or active ionization. As the capacitance, C, increases due to proximity of the statically charged object to another object, less voltage pressure (V) is available for induction or active ionization.

Even more problematical is the fact that an insulative material in motion can contact another surface causing triboelectric generation of static charge and the resulting cling without ever separating from the surface. Static generation is most commonly observed when similar and dissimilar materials contact and separate. However, the static generation occurs as soon as one material touches the other. As the molecules of one material closely approach those of another material, there is a transfer of electrons, generating a static charge. Whenever there is high capacitance and insufficient voltage pressure to induce or actively ionize, contact between objects will generate static charge and the resultant static problems, i.e., cling, drag, misalignment, electrostatic discharge (ESD), etc.

One example of the deleterious effects these problems can have is in the die cutting of thin, light, insulative materials such as foam or paperboard pieces or packaging materials. As the die compresses and cuts the material, there is contact between the die surfaces and the small cut pieces resulting in static generation in the cut pieces and clinging of the cut pieces to the die surfaces. Because the transfer of electrons and the cling occur almost instantaneously and while the surfaces are in intimate contact, conventional static eliminators cannot neutralize the charge by induction or active ionization.

In another example, a fine filament, e.g., a thread, fiber, or yarn, is passed through a conduit, e.g., a tube or pipe, which supports it through space. An example of such apparatus is an air blown piping system. Similar apparatus may be used to transport powders or particulate materials. There is contact between the filament, powder, etc. and the walls of the conduit, generating a static charge. The resulting cling or drag can cause severe handling problems. Even the use of conductive plastic or metal conduit does not solve the problem; in some cases the problem is even more severe due to triboelectric generation of static charge on the insulative filament as the dissimilar materials of the filament and conduit contact and separate. Conventional static eliminators are not effective in this application not only because of the capacitance of the charged filament within the conduit but also because of space restrictions within the conduit itself.

Yet another example involves the transport of a light, flat, insulative material, e.g., paper, plastic, fabric, etc., across another flat surface without continuous support, e.g., a flat envelope contacting the side surfaces of a machine, a sheet of paper sliding down a feed board of a printing or copy machine, a fabric sliding across a flat surface of a cutting machine, or a thin sheet of plastic film moving across the flat surfaces of a film processing machine. In each case the material, by contact with the machine surface, can develop a static charge which results in handling or ESD problems. While the material is in contact with the machine surface, it has a higher capacitance and a reduced voltage pressure; thus the static charge cannot be effectively removed by conventional static eliminators.

There are many similar applications where a moving material contacts a similar or dissimilar material resulting in static charge, and where the resulting problems of cling, repulsion, or ESD cannot be addressed by known means.

It would be desirable to have a means of eliminating the static charge on such materials using the ionizing mechanisms described above, but with the ionizing means being in a form integral with the surfaces over which the sheet material must pass. For example, it would be desirable to have a static eliminator which can be installed to cover or be incorporated into a surface directly under the moving sheets as they pass through the machine and/or in closed or restricted areas of the machine. Prior art static eliminators are too bulky to be useful in such ways.

In another context, conductive fabrics have been developed for static control either by weaving conductive threads together to form a fabric or by weaving the threads into a fabric with other non-conductive threads. Alternatively, long conductive threads have been pressed to form a felted mat, alone or with non-conductive threads. Such fabrics provide the small cross-sectional area fiber ionizing "points" required to effectively control static on moving sheet materials only at the cut edges of the fabrics. Because insulators, by definition, cannot be grounded, these types of conductive fabric do not ionize across their flat surfaces. Although there might be some reduction of high voltage to a conductor or conductive fabric surface, these fabrics are not efficient at inducing static charges to ionize.

The low profile ionizing surface described herein was developed to address the need for a flat, non-bulky, low profile sheet-, strip-, ribbon-, or tape-form static eliminator capable of neutralizing static charge on an insulative material on or near its flat, low profile surface.

SUMMARY OF THE INVENTION

In one embodiment, the invention is a low profile ionizing surface (LPIS) for use, e.g. as a static eliminator or charging means, in an apparatus through which insulative material flows or is propelled. The LPIS includes a low profile fibrous network having an exposed and an adhered surface. The network includes a multiplicity of electrically conductive microfibers crossing one another at intervals to be in electrically conductive communication with one another across the network. The length of the microfibers is selected to provide a multiplicity of microfiber ionizing points disposed across the network, and the thickness of the network is significantly less than the average length of the microfibers. The LPIS also includes an adhesive means including an adhesive layer to fix the adhered surface to a surface of the apparatus. Thus, when the network is grounded or electrically charged, air between the microfiber ionizing points and the material passing the exposed surface is sufficiently ionized to remove static charge from the material or to attract or repel the material to or from the apparatus surface.

In a narrower aspect, the network of microfibers is in the form of a self-supporting sheet or tape, and the adhesive means is a peel-and-stick adhesive backing on the adhered surface. The peel-and-stick backing includes an adhesive layer on the adhered surface of the network and a peel-away layer contiguous with the adhesive layer. Thus, the peel-away layer may be removed, leaving the adhesive layer on the adhered surface for fixing the adhered surface to the machine surface.

In another aspect, the invention is a kit to install a LPIS on a surface of an apparatus. The kit includes a multiplicity of electrically conductive microfibers and an adhesive means. Thus the adhesive means may be applied as an adhesive layer to the apparatus surface and the microfibers may be randomly disposed across the adhesive layer to form the above-described low profile network in the form of a non-woven, fibrous network of the microfibers, the network having an adhered surface fixed to the machine surface by the adhesive layer and an exposed surface.

In yet another aspect, the invention is an ionizing part for an apparatus through which insulative material flows or is propelled. The part includes a part surface past which the material is passed, and the above-described low profile, fibrous network and adhesive means, the adhesive means including an adhesive layer to fix the network adhered surface to the part surface. Thus, when the network is grounded or electrically charged, air between the microfiber ionizing points and the material passing the exposed surface is sufficiently ionized to remove static charge from the material or to attract or repel the material to or from the part surface.

In still another aspect, the invention is a method for ionizing air between a surface of an apparatus and an insulative material passing the apparatus surface. The method involves fixing to a surface of the machine, by an adhesive means including an adhesive layer, a low profile, fibrous network having an exposed surface and an adhered surface. The fabric includes a multiplicity of electrically conductive microfibers crossing one another at intervals to be in electrically conductive communication with one another across the network. The length of the microfibers is selected to provide a multiplicity of microfiber ionizing points disposed across said network at or near said exposed surface, and the thickness of the network is significantly less than the average length of the microfibers. The network is then electrically grounded or an electric charge is applied to the network, and the material is passed through the apparatus across or near the network exposed surface. Thus, air between the exposed surface and the material passing the exposed surface is sufficiently ionized to remove static charge from the material or to attract or repel the material to or from the apparatus surface.

BRIEF DESCRIPTION OF THE DRAWINGS

For a better understanding of the present invention, together with other objects, advantages, and capabilities thereof, reference is made to the following Description and appended claims, together with the Drawings in which:

DETAILED DESCRIPTION OF THE PREFERRED EMBODIMENTS

Figure 1:
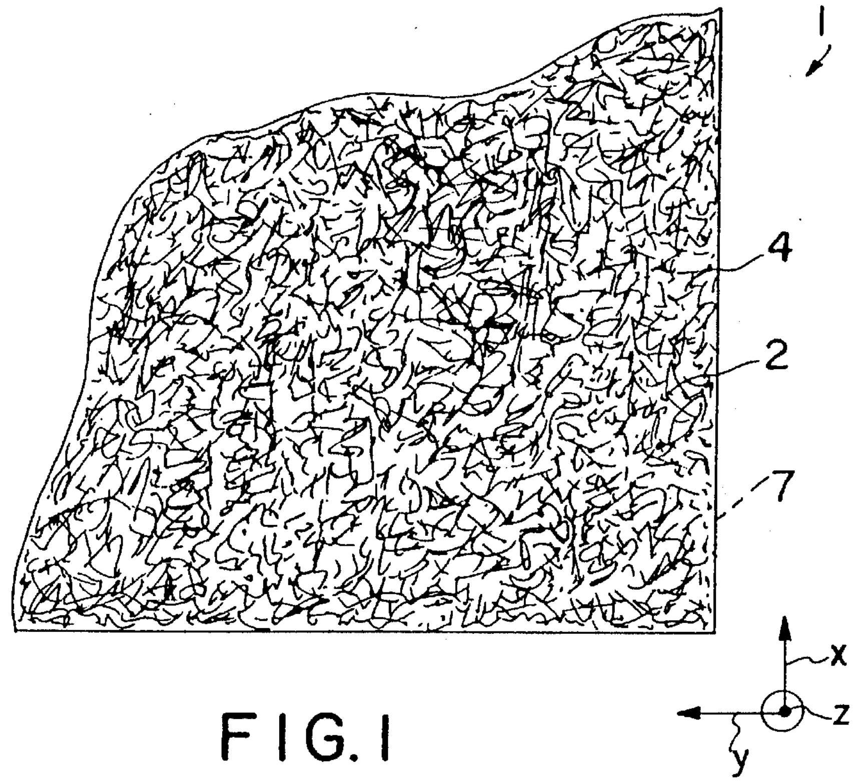
FIG. 1 is a plan view of a portion of a sheet-form LPIS in accordance with one embodiment of the present invention.

An exemplary embodiment of the low-profile ionizing surface in accordance with the invention is a static eliminator in the form of a low-profile sheet or tape of a network of short microfibers of a conductive material, the sheet- or tape-form web backed by a layer of an adhesive material.

By the term "tape" or "tape-form", as used herein, is meant a material similar to the LPIS in sheet form cut or formed in the shape of a strip, ribbon, or tape having a length much greater, e.g., at least three times greater, than its width By the term "short microfibers" as used herein, is intended fibers about 0.5–50 μm, preferably about 8 μm, in diameter and about ⅛"–3", preferably about 1", long. As can be seen from these size ranges, although the fibers are short the aspect ratio (length to diameter) of the fibers is high.

The gathering of the appropriate microfibers to achieve the desired low-profile network may be accomplished in any of several ways. A non-woven network is described in detail herein, in which the individual microfibers are arranged randomly in the network. Alternatively, the network can have other configurations. For example, it can be a woven or knitted fabric in which the microfibers are spun into a yarn, or a web can be formed by flocking or randomly dispersing the microfibers to adhere to the adhesive layer. The particular configuration for a given application is typically selected based on manufacturing cost and installation requirements.

The term "network" as used herein may be defined as a construction in which many electrically conductive microfibers cross one another at intervals to be in electrically conductive contact with one another across the network. The length of the microfibers is sufficiently short so that a great many microfiber provide ionized points are disposed across the network surface. Typically, the fibers extend minimally in the direction of the network thickness, i.e. they extend less in the direction of the network thickness than in the direction of its length and width, lying relatively flat within the network. Thus, the orientation of the microfibers produces a very low profile sheet in which the thickness of the network is significantly less than the average length of the microfibers.

The network is preferably about 1–50 mil thick, more preferably about 1–10 mil, most preferably about 2–5 mil. The individual microfibers may be relatively straight, with ends terminating in a direction parallel or near parallel to the exposed surface of the network. Alternatively, the fibers may have a bent, crimped, or slightly curled configuration, resulting in fiber ends throughout the network which terminate both in this parallel or near parallel direction or in a direction normal or nearly normal to the exposed surface of the network or in an orientation between these two extremes.

The adhesive layer of the LPIS adheres the above-described network to a surface within an apparatus or machine through which paper, other insulating sheets, or other statically chargeable materials flow or are propelled. Examples of such a machine are a printing press, office copier, printer, or other materials processing equipment. In such a machine, each sheet (or other material) is nearly continuously resting on or moving across, e.g., stacked sheets, feed boards, tapes, rollers, or other surfaces, and is likely to build up a static charge on its surfaces. The LPIS described herein is adhered onto and parallel to a machine surface over which the sheet must pass, and the LPIS is grounded. For example, the LPIS may be installed so that the network is under the sheets being fed through the machine and so that the opposite side of each sheet does not touch any machine parts. As each sheet passes across the grounded LPIS, static charge buildup on the sheet is neutralized by ionization, as described further below.

As mentioned above, the thickness of the preferred network is significantly, e.g. as much as an order of magnitude, less than the average length of the individual microfibers. The flat orientation of the fibers produces a low-profile network in which, on installation of the LPIS, the fiber ionizing points, do not extend significantly above the exposed surface of the web, and in which few if any of the fiber ioninzing points contact the surface from which static charge is to be removed. The small cross-sectional area at the tip of each of these microfiber ends provides the required "ionizing points" to induce ionization by increasing the voltage pressure or potential at each microfiber ionizing point, inducing ionization of the air between the passing statically charged material and the microfiber ionizing points. The ionized air and the conductive ionizing points provide a path to ground for the charge.

In conventional static control fabrics, as described above, long, conductive, e.g., carbonized or metallized, threads are woven together to form the fabric or are woven into a fabric with other, non-conductive threads. Alternatively, a woven or non-woven long fiber fabric may be metallized to make it conductive. Also, as described above, the long conductive threads may be pressed to form a felted mat, alone or with non-conductive threads. Only the cut edges of such fabrics can effectively control static on moving sheets or other insulating materials. Thus, conventional wisdom would dictate that only the cut edges of the web described herein would be suitable for use as a static eliminator. It has been found that, contrary to conventional wisdom, the static eliminator described herein is effective in removing static charge from sheet and other materials moving across the flat exposed surface of its grounded network.

Suitable electrically conductive materials for the microfibers include, but are not limited to carbon, metal coated carbon, copper, stainless steel, metallized or metal coated acrylics, and conductive polymers. The entire fiber may be fabricated from the conductive material or, alternatively, a conductive or non-conductive fiber core may be coated with a conductive material or metallized to form the electrically conductive microfibers. Further, non-conductive microfibers can be formed into a web and metallized, coated, or otherwise treated, after the web-formation process, to produce the network.

Preferred for the microfibers is carbon microfiber coated with a very thin layer of a metal such as nickel or stainless steel microfiber. The microfibers may be fabricated by spinning, extrusion, drawing, or other known process for producing microfibers of the above-described diameter. The length produced by such processes, however, is normally far greater than that suitable for the relatively short microfibers described herein. The fibers may be cut (chopped) or otherwise shortened for use in the above-described network.

Optionally, other materials may be included with the microfibers in the network. For example, the fibers may be embedded in or coated with a matrix material, e.g. a starch, wax, or polymer, to aid in adhering the fibers to one another to form a self-supporting web. Any such additional materials, however, must not interfere with the electrical contact between adjacent fibers, the grounding of the network, and the ionization process at the points. Alternatively, the fibers, e.g. those of a conducting polymer, may be self-adhering without additional materials, e.g. by passing the web through heated rollers to heat seal the fibers to one another. Also alternatively, the affixing of the microfibers of the network by the adhesive may by itself be sufficient to maintain the integrity of the network. Suitable materials for the adhesive layer include but are not limited to known acrylic adhesives, or conductive adhesives such as an acrylic incorporating silver coated nickel particles (e.g. Type 9703 adhesive, available from Minnesota Mining & Manufacturing, St. Paul, Minn., or ARclad conductive adhesives, available from Adhesive Research, Inc., Glen Rock, Pa.

The LPIS described herein may be fabricated by forming, e.g., a continuous length of the above-described fibrous network by conventional means such as wet-laying the fibers to form a web or mat, for example using papermaking techniques. Alternatively, the web may be fabricated by heat-sealing randomly scattered, e.g., conductive polymer or polymer-coated microfibers, or by embedding randomly dispersed microfibers in, e.g., a conductive polymer matrix. Any conventional web-forming means resulting in the above-described low-profile network is suitable. Optionally, the fabricated web or mat may be stretched, rolled, pressed, or otherwise treated to flatten the orientation of the fibers.

Adhesive is then applied to one flat surface of the network, before or after trimming the network to the desired size and shape. Thus the network surface nearest the adhesive becomes the adhered surface of the device and the opposite surface becomes the exposed surface. The adhesive is applied by a conventional method, e.g. by applying a solution or melt of the adhesive to the network by conventional coating methods such as spraying, brushing, or doctor blading. Alternatively, a self-supporting adhesive layer may be formed by conventional means, e.g. from a solution or a melt. The self-supporting adhesive layer then may be bonded to the network by conventional means, e.g. by heat bonding.

The adhesive-backed network may be applied to a machine surface, e.g. a surface over which sheet materials will pass. The adhesive-coated surface of the LPIS is, e.g., pressed onto the machine surface, and the network of the LPIS is grounded. Conventional techniques may be used for grounding the network, whether adhered to a stationary or a moving machine surface. Alternatively, the network may be adhered by a conductive adhesive to a metal or other conductive machine surface, and the machine surface may be grounded in a conventional manner.

Optionally, a peel-and-stick embodiment of the LPIS may be fabricated. Such an embodiment is easily stored, carried, and handled, for example by a repair technician or machine operator. This embodiment is fabricated by applying a peel-off layer to cover and protect the adhesive layer until installation. If necessary, the sheet or tape may be trimmed to size or shape before peeling away the peel-off layer and installing the LPIS. Conveniently, the peel-and-stick LPIS may be fabricated as a sheet- or tape-form roll of a length at least several times the average length required for a single LPIS installation. The required length may then be, e.g., cut from the roll. The peel-off layer may be a conventional polymeric sheet or polymer-coated paper, or may be any self-supporting sheet material that is less wetted by the selected adhesive than is the fibrous network, such that the peel-off layer lightly adheres to the adhesive but is readily pulled away without damage to the adhesive layer.

In another alternative, the LPIS may be in the form of a self-supporting network strip with adhesive means at each end of the strip, so that the network may be installed to be suspended across a space or gap. In this embodiment, the statically charged material can pass on both sides of the strip. Alternatively, volumes of air can be ionized or charged as the air passes by the strip.

Also alternatively, the LPIS may be fabricated in situ, e.g. before the machine is assembled or on site after installation of the machine, by the following method. A thin layer of a suitable adhesive, preferably a conductive adhesive, is applied, e.g. by brushing, wiping, or spraying, or in the form of a transfer adhesive sheet or tape, to the surface of the area or part of the machine on which the LPIS is to be mounted. The adhesive may be applied, e.g., as a dryable solution, as a melt, or as a curable liquid. Short lengths of conductive microfibers may then be randomly scattered over the adhesive layer in a sufficient quantity to produce a non-woven network, the microfibers of which are affixed to the machine surface by the adhesive layer. Separate containers of, e.g., loose short microfibers and brush-on or spray-on adhesive (or sheets, strips, or rolls of transfer adhesive) may be packaged together as a kit for such in situ installation of the static eliminator. If necessary, the LPIS may be pressed or rolled against the machine surface so that the microfibers lie flat in the network, forming a low-profile LPIS. Also, the microfibers are in electrically conductive contact with one another across the network by physical contact with other microfibers and/or by being conductively interconnected by a conductive adhesive and/or matrix, as described above.

In operation, the LPIS described herein acts to neutralize the surface charge on materials on or near its flat exposed surface, either by induction, ionizing the air in the voltage field to provide a path to ground for the excess charge, or by providing sufficient positive or negative charge to balance the surface charge.

The following theoretical explanation of the mechanism by which the LPIS operates inductively is presented as an aid to understanding of the invention, and is not intended as a limitation on the invention described herein. The surface charge on a moving material, e.g. a sheet material, creates a voltage field around the material. Enough of the microfiber ends, present throughout the network, are sufficiently close to the exposed surface of the network and are sufficiently small in diameter to act as the above-described ionizing inductive points. That is, the statically charged material's electric field becomes concentrated at these microfiber ionizing points at the network surface as the charged material passes, ionizing the air between the charged material and the network. The surface charge then flows across the ionized air and through the conductive microfibers to ground.

Alternatively to grounding the LPIS for inductive static control, a voltage may be applied to the network from an external voltage source by conventional means, the voltage being sufficient to ionize the air immediately adjacent the exposed surface of the network to neutralize the excess surface charge on the material passing near the LPIS. Typically, an ac or dc voltage source is used to produce both positive and negative ions, the voltage being capacitively coupled to the network through an insulator, in a conventional manner, to avoid discharge of voltage from the network. The passing charged material then attracts either positive or negative ions to neutralize its surface charge. Also alternatively, a pulsed ac or dc voltage source or a piezoelectric or other voltage source may be used to provide the ionization required to neutralize the surface charge.

In alternate applications, the LPIS can be used to charge materials coming near its surface by using a single voltage polarity to induce a polarity onto the passing material to cause it to become charged and to cling to or repel machine surfaces. For example, certain web material processing machines have an unwind or winder station where continuous rolls of material are fed into a portion of the processing machine, for example the feed inlet portion of the machine. When an in-process roll runs out, another roll must be fed into the machine to replace it. In a typical prior art process, the beginning of the replacement roll has been spliced to the end of the first roll by, e.g., taping the ends together. The device described herein can facilitate this splicing process without interrupting the continuous operation of the machine. The ability of the device to attract or repel the sheet material may be used to cause the ends to attach themselves to another charged surface, either to the rolls themselves or to carrier rollers, splicing the ends "on the run" by electrostatic attraction to the rollers. The spliced ends then are released from the charged surface by repulsion, and the feed rollers pick up the repelled spliced ends for continuous operation. No splicing tape is required in this process. Although charging devices for this purpose are known in the art, the device described herein provides a LPIS which can be installed to be integral with the flat surfaces of the rollers, charging devices, etc.

The description below of various illustrative embodiments shown in the Drawings is not intended to limit the scope of the present invention, but merely to be illustrative and representative thereof.

Figure 2:
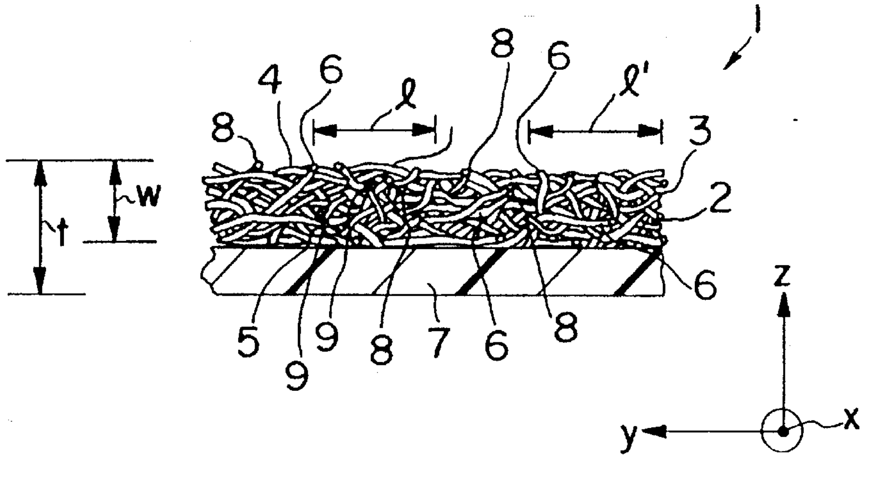
FIG. 2 is a cross-sectional elevation view, not drawn to scale, of the LPIS portion of FIG. 1.

Referring now to FIGS. 1 and 2, sheet-form LPIS device 1, in accordance with one embodiment of the present invention, includes non-woven network 2 of microfibers 3. Network 2 includes exposed surface 4 and adhered surface 5 extending generally parallel to one another. Microfibers 3 are randomly distributed within network 2 in the length (x) and width (y) directions, as best shown in FIG. 1. Microfibers 3 lie relatively flat within network 2, extending less in the direction (z) of the network thickness than in the x and y directions, to produce a thin network exhibiting a low profile, as network thickness w shown in FIG. 2. Thin adhesive layer 7 is applied to network 2 providing thin, low-profile LPIS 1 of thickness t, as shown in FIG. 2.

As illustrated schematically in FIG. 2, each microfiber 3 has a bent or slightly curled configuration, resulting in a significant number of fiber ends 6 throughout the network which terminate in a direction normal or nearly normal to exposed surface 4 of network 2 in addition to fiber ends 9 terminating in a direction parallel or nearly parallel to surface 4. Both ends 6 and ends 9 can provide conductive "ionizing points" 8 near exposed surface 4 for ionization of the air within the voltage field of a static charge (not shown), as described below. Preferably, thickness w of network 2 is significantly, e.g. as much as an order of magnitude, less than the average of the lengths, as l, l', etc., of individual microfibers 3. The relatively flat orientation of microfibers 3 which produces low-profile network 2 results, on installation of LPIS 1, in a network 2 in which ionizing points 8 do not extend significantly above exposed surface 4 of network 2. Thus, few if any of ionizing points 8 will contact the material surface (not shown in FIGS. 1 and 2) from which static charge is to be removed. However, there are a sufficient number of ioninzing points 8 at or near exposed surface 4 to inductively eliminate surface charge on the passing charged materials.

Figure 3:
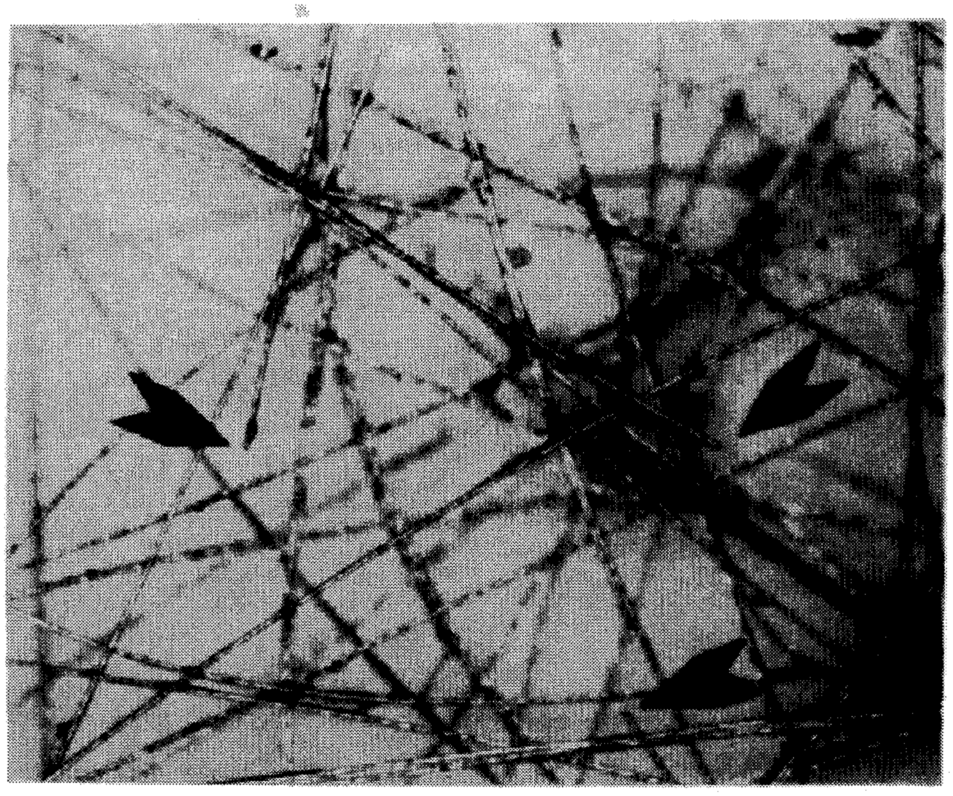
FIG. 3 is a microphotograph of a sheet-form LPIS in accordance with another embodiment of the invention, showing the exposed surface of the network.

FIG. 3 is a photomicrograph of a network of generally straight conductive fibers randomly distributed in the x-y orientation. FIG. 3 shows conductive microfibers lying generally parallel to the exposed surface of the network. The arrows in FIG. 3 indicate fiber ends, similar to ends 9 of FIG. 2, which provide conductive "ionizing points" at or near the exposed surface to inductively eliminate surface charge on passing charged material.

Figure 4:
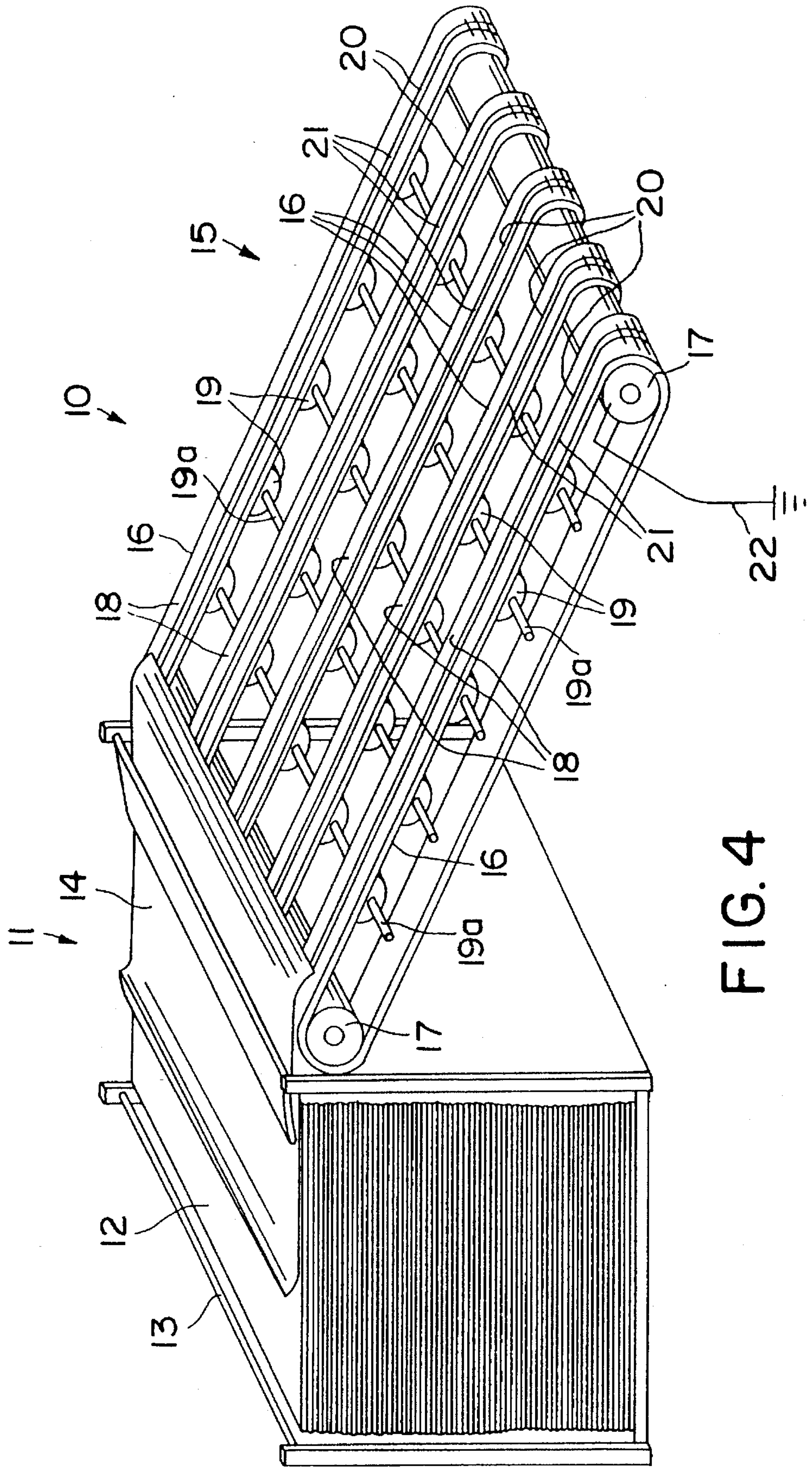
FIG. 4 is a schematic representation in perspective view of a feed portion of a processing machine showing the sheet-form LPIS of FIGS. 1 and 2 installed therein.

FIG. 4 schematically illustrates feed portion 10 of a typical printing press. Feed stack 11 includes individual paper sheets 12 held in rack 13. Top paper sheet 14 is pulled from stack 11, e.g., by friction from a nip roller (not shown), onto feed board 15. Feed board 15 includes continuous belts 16 wrapped about rotating rollers 17. Typically, additional wheels or rollers above sheet 14 cooperate with belts 16 to feed the sheet into the press. (For clarity, the additional wheels or rollers are not shown in FIG. 4.) Belts 16 are driven in a clockwise direction at a constant speed by at least one of rollers 17 providing, in effect, continuously moving feed surface 18 to feed paper sheet 14 into the press (not shown). Additional rollers, as 19, on shafts, as **19*a*, support belts 16, and may be used to assist in driving the belts if necessary. Thus, sheet 14 is continuously supported as it travels from feed stack 11 downward across feed surface 18, leaving surface 18 at the lowest of rollers 17, and is likely to build up a static charge on its surface. A sheet-form LPIS similar to LPIS 1 shown in FIGS. 1 and 2 may be adhered to surface 18** to neutralize such a static charge. If desired, a LPIS also may be installed at the nip roller.

Low-profile strip-form networks 20 of LPIS device 21 are adhered by electrically conductive adhesive layers (not shown) onto and parallel to belts 16 of surface 18. In a similar manner, grounded strip-form LPISs are adhered to the additional belts above sheet 14. Networks 20 are grounded as follows: Each of networks 20 is in electrically conductive communication with a corresponding one of belts 16 via its conductive adhesive layer. Belts 16 are fabricated from a conventional conductive material, for example, having conductive threads incorporated therein to be electrically conductive through its thickness. Each of belts 16 is in electrically conductive communication with the lower of rollers 17, which is grounded via grounding wire 22. Wire 22 is biased against roller 17 for effective electrical contact by a conventional biasing means (not shown). Alternatively, networks 20 may be grounded directly or indirectly by other means conventional to continuously moving surfaces.

In alternative embodiments, a LPIS may be provided across the entire surface of each of belts 16. Also alternatively, strip-form LPISs may be disposed between belts 16 and adhered to, e.g., a flat, stationary feed board surface.

LPIS 21 is thus installed so that upper and lower thin, grounded, conductive, strip-form networks touch or nearly touch sheet 14 as it is fed from feed stack 11 to the press. Thus, as sheet 14 passes across networks 20, any static charge buildup on sheet 14 is efficiently removed.

Alternatively, a voltage may be applied to networks 20 of static eliminator device 21 so that, instead of removing excess charge by grounding the networks, the device is arranged to create positive and negative ions to neutralize the surface charge on sheet 14. The voltage may be supplied directly or indirectly to networks 19 in a manner conventional for applying voltage to moving surfaces.

Figure 5:
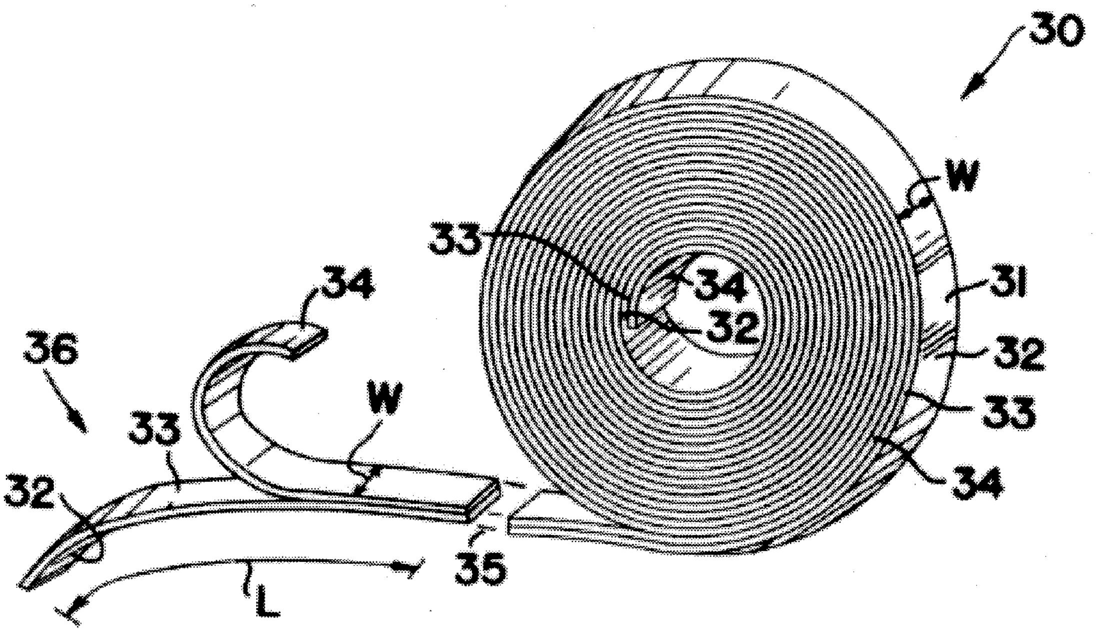
FIG. 5 is a perspective view of a roll of peel-and-stick LPIS tape from which a tape-form LPIS in accordance with another embodiment of the invention may be cut and installed.

FIG. 5 illustrates another embodiment of the LPIS described herein. Roll 30 of peel-and-stick LPIS tape 31 of width W includes network 32, adhesive layer 33, and peel-off layer 34. Tape 31 is wrapped spirally, in a conventional manner, to form roll 30. Predetermined length L of tape 31 is cut from roll 30, as shown at 35. Peel-off layer 34 is then removed from cut length L of tape 31, as shown in FIG. 4, to provide tape-form LPIS 36 of length L and width W, which may then be installed and grounded or charged as described above. The length of LPIS tape 31 on roll 30 typically is several times length L, to provide a plurality of tape-form LPIS strips in convenient form. Alternatively, width W may be much greater than shown in FIG. 4, to provide a peel-and-stick roll from which a plurality of sheet-form LPISs may be cut, or which may be perforated to provide a plurality of convenient tear-off sheets. Also alternatively, a plurality of individual peel-and-stick LPIS sheets or tapes may be provided as a package for convenient storage, carrying, and installation of the LPISs described herein.

Figure 6:
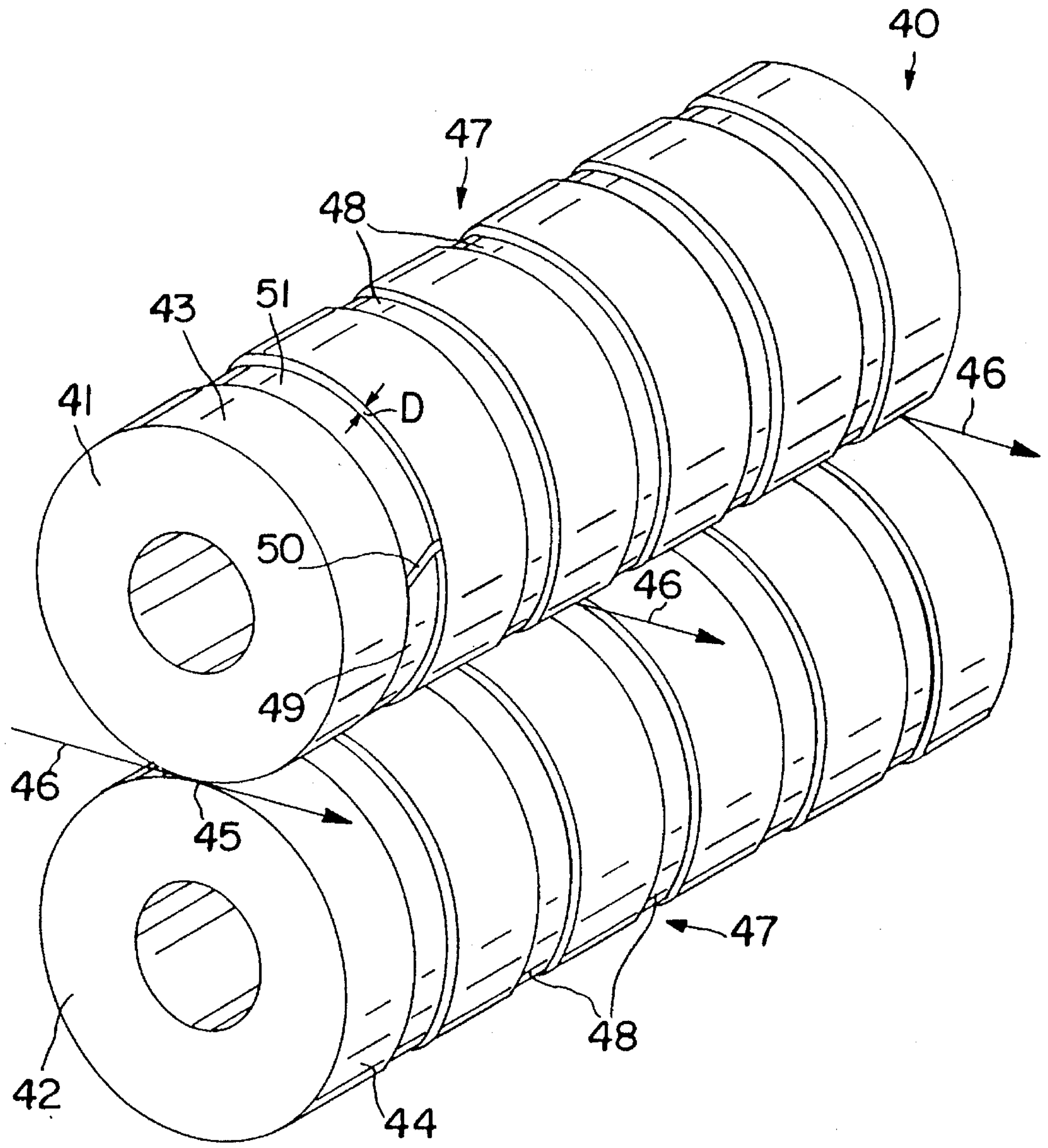
FIG. 6 is a schematic representation in perspective view of a roller portion of the processing machine of FIG. 4, showing a plurality of the tape-form LPISs of FIG. 5 installed therein.

FIG. 6 illustrates another portion of the printing press shown in part in FIG. 4. Roller portion 40 includes upper roller 41 and lower roller 42 having roller surfaces 43 and 44, respectively. At least one of rollers 41 and 42 is biased to hold surfaces 43 and 44 in contact along the length of rollers 41 and 42 at nip 45, which lies across paper path 46. As a paper sheet (not shown), similar to sheet 14 of FIG. 3, travels along paper path 46 and between surfaces 43 and 44 of rollers 41 and 42, respectively, the paper sheet is likely to build up a static charge on its surface. LPIS tapes similar to LPIS 36 shown in FIG. 5 may be adhered to roller surfaces 43 and 44 to neutralize such a static charge.

LPIS device 47 includes continuous strips 48 of LPIS tape installed circumferentially on roller surfaces 43 and 44. Each of LPIS strips 48 includes a network 49 of conductive microfibers fixed to surface 43 or 44 by electrically conductive adhesive layer 50, in a manner similar to that described above for device 20 of FIG. 3. LPISs 49 are grounded directly or indirectly, by means (not shown) conventional to continuously rotating surfaces. Alternatively, a voltage may be applied directly or indirectly to LPISs 49 in a manner conventional for applying voltage to rotating surfaces. Conveniently, continuous circumferential grooves 51 of depth D may be machined into surfaces 43 and 44 to accommodate low-profile strips 48, depth D being equal to or slightly less than the thickness of the strips. LPIS 47 is thus installed so that the conductive microfiber ionizing points of thin, grounded, conductive networks 49 are close to the paper sheet as it is fed through rollers 41 and 42, so that any static charge built up on the paper sheet is neutralized by induction or ionization through networks 49 and, if necessary, adhesive layer 50 as the sheet passes between surfaces 43 and 44.

Alternatively to cutting strips 48 from a peel-and-stick roll, strips 48 may be fabricated in-situ, as described above, by applying adhesive layers 50, e.g., to grooves 51 and scattering microfibers (not shown) onto adhesive layers 50 to form networks 49, or by applying preformed networks 49 to applied adhesive layers 50. Also alternatively, strips 48 and, if present, grooves 51 may wrap helically about the roller surfaces, or may form any pattern on any machine surface which will provide static neutralization to each paper sheet as it follows the paper path through the printing press.

In one alternative embodiment, the LPIS is present on the rollers or other surfaces as an array of low-profile "dots" that is as a plurality of non-continuous, circular or otherwise shaped networks each fixed to the machine surface by an adhesive layer. The size and shape of each dot and the pattern formed by the dots is selected to provide effectively the above-described ionization or charging. Preformed dots, e.g. in a peel-and-stick form, may be applied to the machine surface. Alternatively, the adhesive layers of the individual dots are applied to the machine surface, e.g. through a mask or by printing, and microfibers scattered thereover to form the networks, in a manner similar to that described above for the in situ formation of a static eliminator. The roller or other machine surface may be "dimpled" or otherwise recessed to receive each dot, in a manner similar that shown for grooves 51 and strips 48 in FIG. 6. In a similar manner, such strips or dots may be installed in grooves or dimples in a flat, planar surface to be coplanar with the flat surface and to form a LPIS.

Alternatively, static control may be provided by way of an ionizing machine part for a machine through which material is passed, the part being in the form of a standard machine part with the above described LPIS device applied thereto. The part may take the form of the above-described rollers, flat surface, or other part, and may be supplied as part of the original machine or as a replacement part for the machine. Where necessary, the part may be adapted, e.g., dimpled or grooved as described above to receive the device.

Figure 7:
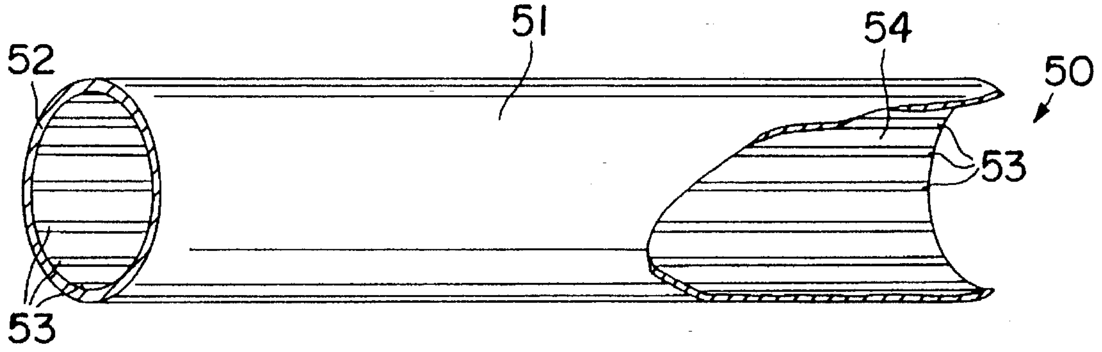
FIG. 7 is a schematic representation of a conduit with a LPIS installed, in accordance with yet another embodiment of the invention.

In a particularly useful embodiment, shown in FIG. 7, an LPIS in the form of static eliminator 50 is applied to the interior of conduit 51 which may be, e.g., a tube or pipe, designed to support and guide a filament (not shown) such as a thread, fiber, or yarn, or a powder or particles through space in an air blown piping system, as described above. There is contact between the filament or other material and wall 52 of the conduit, but any static charge generated is controlled by static eliminator 50, preventing severe handling problems due to cling, drag, etc.

Static control device 50 is fabricated by adhering LPIS strips 53 of the above described network to interior surface 54 of conduit wall 52 parallel to the axis of conduit 51. The LPIS strips may then be grounded or voltage applied in known manner to eliminate static problems. Alternatively, LPIS strips 53 may be applied to surface 54 in a helical pattern, or to only certain portions of the conduit, e.g., within the elbow fittings (not shown) of conduit 51. If necessary, the conduit may be adapted to overcome severe interior space restrictions, e.g., by forming interior grooves (not shown) within the conduit to receive the LPIS strip.

Figure 8:
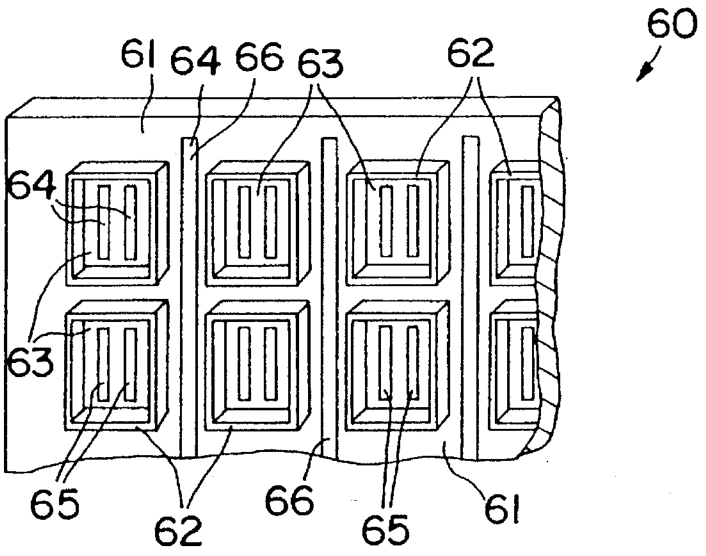
FIG. 8 is a schematic representation of a die with a LPIS installed, in accordance with still another embodiment of the invention.

Shown in FIG. 8 is metal die 60 for the die cutting of thin, light, insulative materials such as foam or paperboard pieces or packaging materials. Die 60 includes flat surface 61, cutting edges 62, and flat surfaces 63 interior to cutting edges 62. As described above, as die cutting edges 62 compress and cut the material (not shown), there is contact between surfaces 61 and 63 of die 60 and the cut pieces resulting in static generation in the cut pieces and clinging of the cut pieces to surfaces 61 and 62. Because the transfer of electrons and the cling occur almost instantaneously and while the surfaces are in intimate contact, conventional static eliminators cannot neutralize the charge by induction or active ionization. LPIS device 64 is provided on die 60 as LPIS strips 65 adhered to each surface 63 and LPIS strips 66 adhered to surface 61. Conductive metal die 60 may be grounded or voltage applied in known manner to eliminate static on the cut pieces or to charge or repel them.

The invention described herein presents to the art a novel, non-bulky, sheet- or tape-form low profile ionizing surface which can effectively eliminate static charge, by induction or active ionization, from the surface of a charged material. The LPIS is useful in such machines as printing or die cutting apparatus, or presses, copiers, or other machines through which materials are propelled. This device is especially valuable when static must be controlled under capacitive conditions, that is when other objects or surfaces are in close proximity to the charged material. The novel LPIS can be installed to be integral with the surfaces over which the material must pass, overcoming the problem of capacitance. For example, the LPIS can be installed to cover a surface directly under moving sheets as they pass through a copier, press, or other machine and/or in closed or restricted areas of an apparatus where the bulkiness of prior art static eliminators prevent their use.

While there has been shown and described what are at present considered the preferred embodiments of the invention, it will be apparent to those skilled in the art that modifications and changes can be made therein without departing from the scope of the present invention as defined by the appended claims.

I claim:

1. A low profile ionizing surface for use in an apparatus through which insulative material flows or is propelled, said low profile ionizing surface comprising:

a low profile fibrous network having an exposed and an adhered surface and comprising a multiplicity of electrically conductive microfibers crossing one another at intervals to be in electrically conductive communication with one another across said network, the lengths of said microfibers being selected to provide a multiplicity of microfiber ionizing points disposed across said network at or near said exposed surface, the thickness of said network being less than the average length of said microfibers; and an adhesive means comprising an adhesive layer to bond said adhered surface to a surface of said apparatus such that, when said network is electrically grounded or electrically charged, air between said ionizing points and said material passing said exposed surface is sufficiently ionized to remove static charge from said material or to attract or repel said material to or from said apparatus surface.

2. A low profile ionizing surface in accordance with claim 1 wherein said network is a non-woven fabric.

3. A low profile ionizing surface in accordance with claim 1 wherein said microfibers are about 0.5–50 μm in diameter and about ⅛"–3" long.

4. A low profile ionizing surface in accordance with claim 1 wherein:

said network of microfibers is in the form of a self-supporting sheet or tape; and said adhesive means is a peel-and-stick adhesive backing on said adhered surface, said peel-and-stick backing comprising an adhesive layer on said adhered surface and a peel-away layer contiguous with said adhesive layer, such that said peel-away layer may be removed, leaving said adhesive layer on said adhered surface for fixing said adhered surface to said machine surface.

5. A low profile ionizing surface in accordance with claim 1 wherein said electrically conductive microfibers are selected from the group consisting of carbon, metal coated carbon, copper, stainless steel, metal coated acrylic, metallized acrylic, and electrically conductive polymers.

6. A low profile ionizing surface in accordance with claim 1 wherein said adhesive layer comprises an electrically conductive adhesive.

* * * * *